United States Patent
Kropf-Eilers et al.

(10) Patent No.: US 7,322,463 B2
(45) Date of Patent: Jan. 29, 2008

(54) CONVEYOR BELT WITH BALL-TYPE REINFORCEMENT ON THE BEARING SIDE

(75) Inventors: Adolfo Kropf-Eilers, Seevetal (DE); Joachim Brückner, Hamburg (DE); Gernot Grosskreuz, Rudolstadt (DE); Eduard Labus, Stelle (DE); Margit Reiner, Blankenburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 0 days.

(21) Appl. No.: 10/578,018

(22) PCT Filed: Oct. 13, 2004

(86) PCT No.: PCT/DE2004/002271

§ 371 (c)(1),
(2), (4) Date: May 3, 2006

(87) PCT Pub. No.: WO2005/051807

PCT Pub. Date: Jun. 9, 2005

(65) Prior Publication Data

US 2007/0034482 A1  Feb. 15, 2007

(30) Foreign Application Priority Data

Nov. 19, 2003 (DE) .................. 103 54 134

(51) Int. Cl.
*B65G 15/34* (2006.01)

(52) U.S. Cl. ..................... 198/847
(58) Field of Classification Search ........ 198/846, 198/847
See application file for complete search history.

(56) References Cited

U.S. PATENT DOCUMENTS

| 3,607,606 A | | 9/1971 | Beninga | |
|---|---|---|---|---|
| 4,162,900 A | * | 7/1979 | Judd | 51/295 |
| 6,116,411 A | * | 9/2000 | Reiner et al. | 198/847 |
| 6,986,419 B2 | * | 1/2006 | Nishikita | 198/847 |
| 2003/0085105 A1 | * | 5/2003 | Sawa et al. | 198/847 |

FOREIGN PATENT DOCUMENTS

| DE | 33 09 228 | 10/1983 |
|---|---|---|
| DE | 25 32 190 | 10/1986 |
| DE | 38 02 963 | 8/1988 |
| DE | 37 35 024 | 4/1989 |
| DE | 38 01 120 | 7/1989 |
| JP | 60 000931 | 5/1985 |

OTHER PUBLICATIONS

International Search Report.

* cited by examiner

*Primary Examiner*—James R. Bidwell
(74) *Attorney, Agent, or Firm*—Collard & Roe, P.C.

(57) ABSTRACT

The invention relates to a conveyor belt (1) provided with a bearing side (2) and a backing side (3) made of an elastomer material, in addition to an embedded reinforcement carrier (4), wherein the bearing side (2) is reinforced with ball-type elements (5).

16 Claims, 1 Drawing Sheet

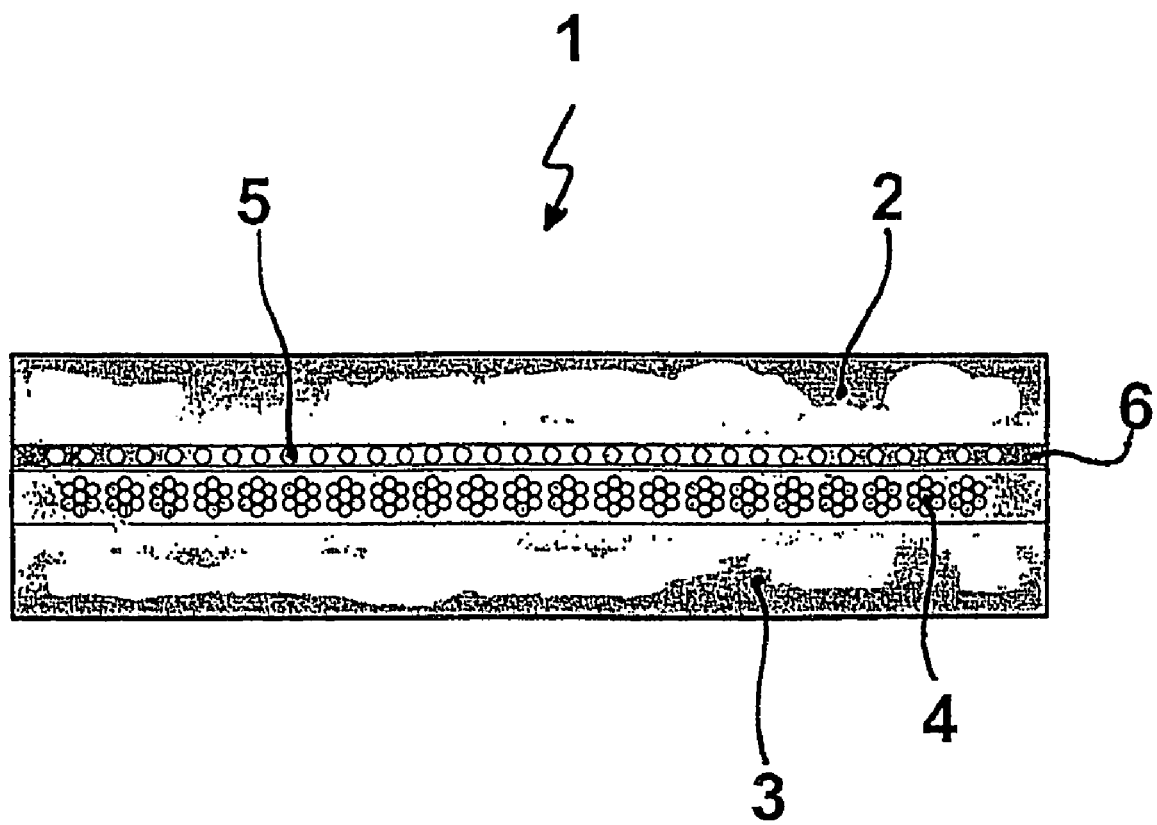

CONVEYOR BELT WITH BALL-TYPE REINFORCEMENT ON THE BEARING SIDE

CROSS REFERENCE TO RELATED APPLICATIONS

Applicants claim priority under 35 U.S.C. §119 of German Application No. 103 54 134.9 filed Nov. 19, 2003. Applicants also claim priority under 35 U.S.C. §365 of PCT/DE2004/002271 filed on Oct. 13, 2004. The international application under PCT article 21(2) was not published in English.

The invention relates to a conveyor belt having a bearing side and a backing side made of elastomer material, as well as an embedded reinforcement carrier, particularly in the form of steel cables or steel cords, or a one-layer or multi-layer reinforcement carrier. In this regard, reference is made to the following prior art, for example: DE 25 32 190 C2, DE 38 01 120 C2, DE 37 35 024 A1, and DE 38 02 963 A1.

Within the scope of a further development, the task consists in making available a conveyor belt having an improved impact protection or cut protection.

This task is accomplished by means of the characterizing part of claim 1, in that the bearing side is reinforced with ball-type elements.

The invention will now be described on the basis of an exemplary embodiment, making reference to a drawing that shows the cross-section of a conveyor belt.

The conveyor belt 1 comprises a bearing side 2 and a backing side 3, which consist of an elastomer material, in each instance. The conveyor belt furthermore has an embedded reinforcement carrier 4 in the form of steel cables.

The bearing side 2 is reinforced with ball-type elements 5 that are disposed within a single layer 6. This layer, in the form of an elastomer matrix, runs close to the reinforcement carrier 4, whereby the ball-type reinforcement extends essentially over the entire width of the conveyor belt. Furthermore, the ball-type elements have essentially the same diameter, whereby the diameter of the ball-type elements corresponds approximately to the layer thickness.

The particular feature of this bearing side 2 reinforced by ball-type elements 5 lies in the round surface of the ball-type elements that are introduced, which deflect a penetrating foreign body, for one thing, i.e. also "brake" it, and for another thing, they counteract a possible notch effect on the opposite side of where the damage occurs. Any damage that has occurred within the bearing side by way of these ball-type elements will not continue to grow (tear further) with this damage geometry, at the same speed, as is the case in a conventional, non-reinforced bearing side. Therefore, damage growth prevention is connected with this new concept.

The bearing side, reinforced with ball-type elements, is also referred to as a damping ball-type element mat.

The following tables state the practical diameter and density range of the ball-type elements and the elastomer densities, in Table 1, on the one hand, as well as concrete experimental data within these ranges in Table 2, on the other hand.

TABLE 1

| | Ball-type elements | | Elastomer density |
|---|---|---|---|
| Material | Diameter [mm] | Density [g/cm$^3$] | [g/cm$^3$] (reinforcement layer) |
| Steel | 1-5 | 7.5-8.7 | 1.1-1.6 |
| PUR | 1-5 | 1.18-1.24 | 1.1-1.6 |
| Aluminum | 1-5 | 2.7 | 1.1-1.6 |
| Glass | 1-5 | 2.6 | 1.1-1.6 |
| Lead | 1-5 | 11.4 | 1.1-1.6 |
| POM | 1-5 | 1.41-1.43 | 1.1-1.6 |

TABLE 2

| | Ball-type elements | | Elastomer density |
|---|---|---|---|
| Material | Diameter [mm] | Density [g/cm$^3$] | [g/cm$^3$] (reinforcement layer) |
| Steel | 1 | 8.0 | 1.1 |
| Steel | 5 | 8.0 | 1.1 |
| PUR | 1 | 1.2 | 1.1 |
| PUR | 5 | 1.2 | 1.1 |
| Lead | 5 | 11.4 | 1.1 |
| Lead | 5 | 11.4 | 1.6 |

The thickness of the reinforcement layer corresponded to the diameter of the ball-type elements in all the experiments.

Reference Symbol List 1 conveyor belt
2 bearing side (cover plate on bearing side)
3 backing side (cover plate on backing side)
4 reinforcement carrier (steel cables)
5 ball-type elements
6 layer of the ball-type elements (reinforcement layer)

The invention claimed is:

1. Conveyor belt (1) having a bearing side (2) and a backing side (3) made of elastomer material, as well as an embedded reinforcement carrier (4), wherein the bearing side (2) is reinforced with ball-type elements (5) having a diameter of 1 to 5 mm disposed within a single layer (6) and wherein the elastomer density of the ball-type element reinforcement is 1.0 to 2.0 g/cm$^3$.

2. Conveyor belt according to claim 1, wherein the layer (6) is disposed close to the reinforcement carrier (4).

3. Conveyor belt according to claim 1, wherein the layer is disposed approximately in the center of the bearing side (2), specifically with reference to the thickness of the bearing side.

4. Conveyor belt according to claim 1, wherein the layer is disposed close to the surface of the bearing side (2), specifically with complete embedding.

5. Conveyor belt according to claim 1, wherein the ball-type element reinforcement extends over the entire width of the conveyor belt.

6. Conveyor belt according to claim 1, wherein the ball-type element reinforcement extends parallel, with reference to the width of the conveyor belt, for example in the center or the two edge regions of the conveyor belt.

7. Conveyor belt according to claim 1, wherein the ball-type element reinforcement extends essentially over the entire length of the conveyor belt.

8. Conveyor belt according to claim 1, wherein the ball-type element reinforcement extends partially with reference to the length of the conveyor belt.

9. Conveyor belt according to claim 1, wherein the ball-type elements (5) comprise plastic.

10. Conveyor belt according to claim 9, wherein the ball-type elements (5) comprise polyurethane (PUR) or polyoxymethylene (POM).

11. Conveyor belt according to claim 1, wherein the ball-type elements (5) comprise glass.

12. Conveyor belt according to claim 1, wherein the ball-type elements (5) comprise a metallic material.

13. Conveyor belt according to claim 12, wherein the ball-type elements (5) comprise a steel that has been hardened throughout, or aluminum or lead.

14. Conveyor belt according to claim 1, wherein the ball-type elements (5) have essentially the same diameter.

15. Conveyor belt according to claim 1, wherein the diameter of the ball-type elements (5) is 3 to 4 mm.

16. Conveyor belt according to claim 1, wherein the elastomer density of the ball-type element reinforcement is 1.1 to 1.6 g/cm$^3$.

* * * * *